Sept. 1, 1931. H. P. MASSEY 1,820,919
AIRCRAFT
Filed May 31, 1930 2 Sheets-Sheet 1
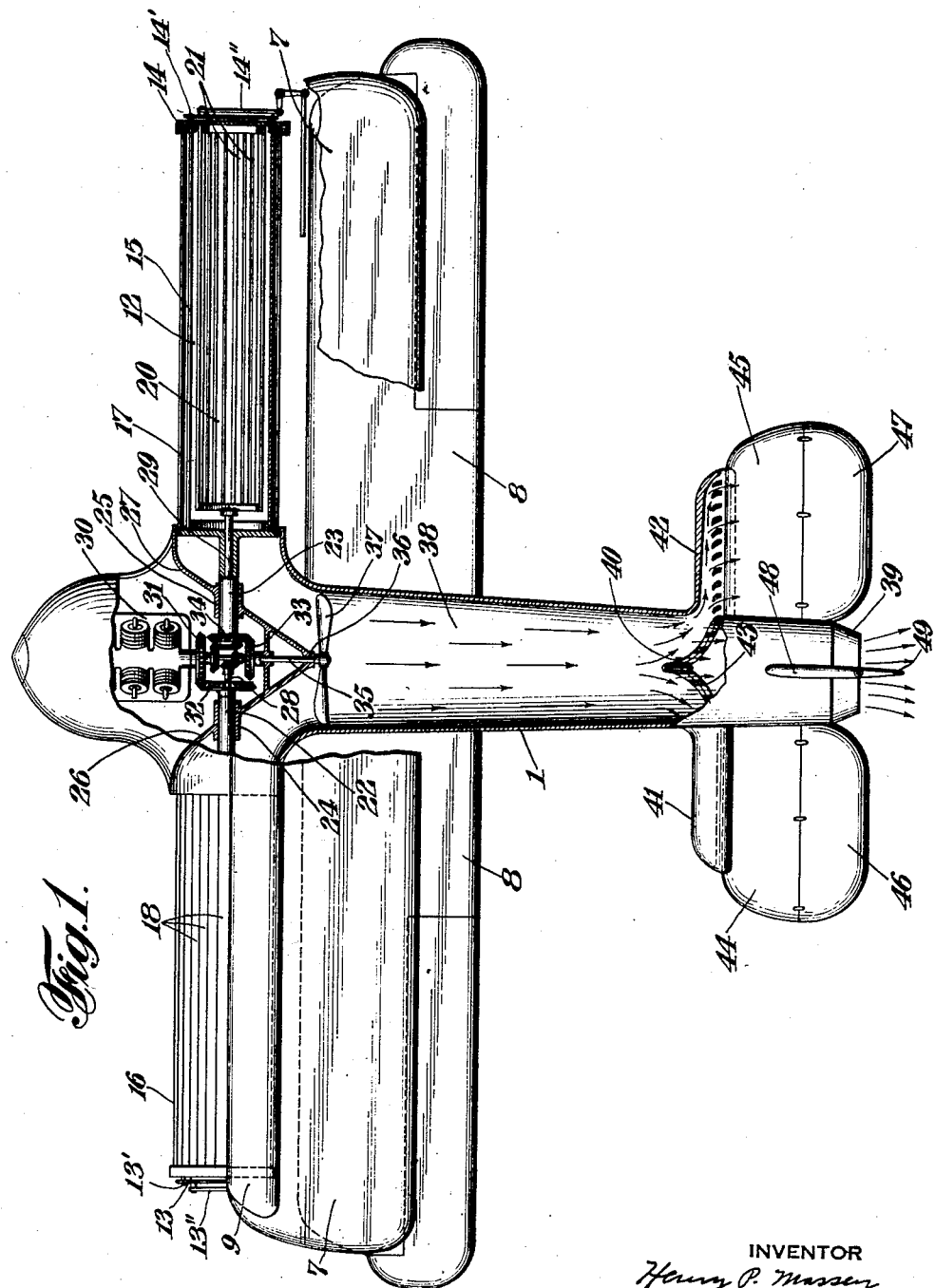
INVENTOR
Henry P. Massey
BY
his ATTORNEYS

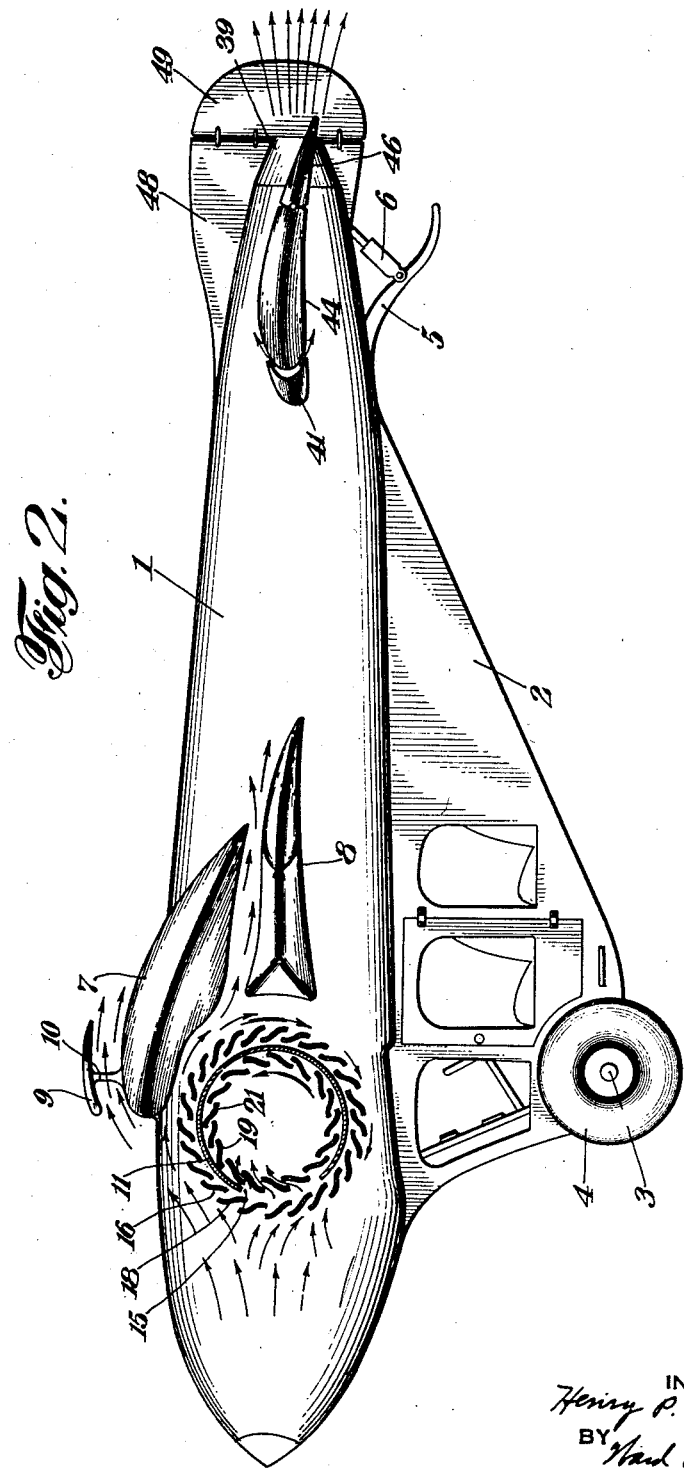

Patented Sept. 1, 1931

1,820,919

UNITED STATES PATENT OFFICE

HENRY P. MASSEY, OF MONTCLAIR, NEW JERSEY

AIRCRAFT

Application filed May 31, 1930. Serial No. 457,907.

My invention relates to aircraft in general and the main object is to provide an improved lifting arrangement for aircraft. In its particular contemplated usefulness it is adapted for use with airplanes. The invention is designated particularly to create a lifting effect both with and without a forward movement of the airplane relative to the earth.

Further and more specific features and advantages will clearly appear from the detailed description given below taken in connection with the accompanying drawings which form a part of the specification.

In the drawings:

Fig. 1 shows the airplane in plan view, with certain parts broken away in section to more clearly illustrate certain features of the invention, and Fig. 2 shows the airplane in side elevation with the rotors and associated cylinder member in section to more clearly illustrate their construction.

Referring to the drawings and more particularly Fig. 2: the airplane body is designated as 1 and that part of the body adapted for the accommodation of the pilot and passengers, etc. is designated as 2. A landing gear chassis is designated in general by reference to the axle 3 and the landing gear wheels carried thereby designated with reference to the wheels shown as 4; this wheel being supplied with the modern form of large diameter tire to relieve the plane from landing shocks in a manner well known to those skilled in the art; it being understood that the landing chassis is also provided with suitable means for absorbing the landing shock as is well known to those skilled in the art. A tail skid is designated as 5 and is provided with a suitable resilient device 6 for absorbing the shock; this device in the present embodiment being illustrated as a hydraulic device, the nature of which is well known to those skilled in the art.

The body has attached thereto an upper airfoil 7 and a lower airfoil 8 arranged in general according to my prior Patent No. 1,714,609, May 28, 1929. The upper airfoil 7 carries supported therefrom and extending longitudinally thereof an auxiliary airfoil 9 supported by suitable means such as the strut members 10 (see also Fig. 1). A pair of fixed hollow relatively smooth cylindrical members 11 and 12 are substantialy rigidly but angularly adjustably supported from the body 1 adjacent their inner ends and are suitably supported adjacent their outer ends by brackets such as 13 and 14, which are carried by the wings 7 and 8 (the member 13 being omitted from Fig. 2 for the purposes of clarity and in order to better illustrate the parts normally covered thereby). These cylinders are each provided with longitudinally extending slots or openings such as 15 which are located on the front of said cylinders. The outer ends of the cylinders 11 and 12 are supported from the respective brackets 13 and 14 by means of studs such as 13' and 14' which are integral with the cylinders and are positioned in arcuate slots formed in the said brackets; and these studs are attached to respective plates and cooperating mechanism designated in general as 13" and 14"; whereby provision is made for adjusting the cylinders angularly about their axes, to thereby adjust the peripheral position of the slot 15. It is to be understood that this adjustment may be made by the pilot initially and also while in flight, by means of the adjusting mechanism such as 13" and 14" which terminates adjacent the pilot's seat. A first pair of rotors 16 and 17 are positioned concentrically of the cylinders 11 and 12 and are suitably spaced in external relation thereto; extending throughout the length of said cylinders. These rotors are provided with blades such as 18, providing therebetween openings through which the air is adapted to pass. These external rotors are adapted to be rotated in a clockwise direction as viewed in Fig. 2, by means to be hereafter described more fully. Similarly, a second pair of rotors 19 and 20 are arranged concentrically of the cylinders 11 and 12, suitably supported in spaced relation thereto and extending substantially throughout the length thereof. These rotors are similarly provided with blades such as 21 providing openings therebetween through which air is adapted to be passed. The inner rotors 19 and 20 are driven in an anti-clockwise direction as viewed in Fig. 2, by suitable means hereafter to be described.

Referring more particularly to Fig. 1, the outer rotors 16 and 17 are in driving engagement at their ends with hollow driving shafts 22 and 23 which are suitably supported in bearings such as 24 and 25 formed integral with the air duct walls 26 and 27 which terminate rearwardly in general conical form. The inner rotors 19 and 20 carry attached thereto the driving shafts 28 and 29 which are journaled within the hollow shafts 22 and 23, in any suitable manner. Suitable motive means is designated as the engine 30 situated in the forward portion of the body. The crank shaft of the engine is suitably connected for driving the bevel gear 31 which is in mesh with the bevel gear 32 rigidly attached to the hollow shaft 22. The shaft carrying the bevel gear 31 also serves to drive the bevel gear 33 at the same rotative speeds and the bevel gear 33 is in mesh with a corresponding bevel gear 34 rigidly attached to the hollow shaft 23. Similarly, bevel gears are carried by the main engine shaft driving the gears 31 and 33 and arranged to drive the shafts 28 and 29 in an opposite direction to the rotation of the shafts 22 and 23. It will therefore be seen that the two outer rotors 16 and 17 are driven in the same direction at the same speeds, while the two inner rotors 19 and 20 are driven in the opposite direction at the same speeds; the outer rotors being therefore driven at one speed and the inner rotors being driven at one speed, it being understood that the relative speed of the inner rotors and the outer rotors while in the present embodiment being the same may, if desired, be different, it being within the contemplation of the invention that it may prove desirable to drive the inner rotors and the outer rotors at different speeds. The shaft carrying the bevel driving gears is rigidly attached to a propeller shaft 35 which is suitably journaled at its outer end in the gearing 36 formed integral with the air duct walls; and a propeller 37 is carried by the shaft 35 and adapted to be driven thereby to force air in a rearward direction as indicated by the arrows in Fig. 1.

The air duct walls 26 and 27 together with suitable walls formed in the body 1 provide two air ducts in communication with the interior of the cylinders 11 and 12 and these air ducts merge into a major air duct 38 formed in the upper portion of the body 1 and extending rearwardly longitudinally thereof and opening outwardly at the tail of the body as indicated at 39, to permit air passing through the air duct 38 in the body 1 to be blown outwardly through the rear end of the body. A fixed conical distributor head 40 is positioned in the air duct 38 and is provided with openings therein to permit a portion of the air flow through the air duct 38 to pass rearwardly outwardly while deflecting a portion laterally outwardly through oppositely extending auxiliary air ducts 41 and 42. An adjustable cone 43, operable from the pilot's seat, is arranged behind the cone 40 and is provided with openings corresponding to the openings in 40 and is adapted to be adjustably rotated about the axis of the cone to regulate the passage of air through the openings in 40 to thereby regulate the flow of air through the tail and outwardly through the auxiliary ducts 41 and 42. The auxiliary ducts 41 and 42 diminish in cross section in area outwardly and are provided with rearwardly extending openings and upper and lower longitudinal extending shields in such manner that the air passing outwardly through the ducts 41 and 42 passes out through the openings and within the shields in a substantially uniform air flow directed rearwardly for the purpose to be described following.

Suitable fixed horizontal tail surfaces 44 and 45 are provided with their leading edges in spaced relation but positioned within the upper and lower shields of the auxiliary air ducts 41 and 42 (see Fig. 2); so that the air passing outwardly through the auxiliary ducts is directed across the upper and lower surfaces of the fixed horizontal surfaces 44 and 45. Adjustable horizontal tail surfaces 46 and 47 are provided, and it is understood that these also come within the influence of the air passing outwardly through the auxiliary ducts. By referring to Fig. 2 it will be seen that the auxiliary ducts 41 and 42 are formed in general as a continuation of the horizontal stabilizing surfaces 44 and 45 so that as the airplane moves through the air the housing of the air ducts combines with the stabilizing surfaces to form in effect a suitable airfoil construction. The airplane is also provided with a suitable fixed vertical surface 48 and a movable vertical tail surface 49 in a manner and for purposes well understood to those skilled in the art.

From an understanding of the preceding description of the preferred embodiment of the invention it will be appreciated that one of the novel features of the invention is a sucking or drawing of air to the airplane and the distribution thereby over the sustaining or lifting surfaces thereof, as opposed to the conventional practice of producing this lift reaction on the sustaining surfaces by drawing the airplane through the air. It will be understood of course that the airplane is also propelled through the air but the greater velocity of the air passing over the lifting surfaces is produced by the direct air flow resulting from the rotating cylinders and air screw sucking the air to the airplane and distributing the same by the means heretofore described.

The outer cylinders 16 and 17 act to set the air in rotation in the direction indicated in Fig. 2, whereby a part of the air flow is distributed across the lifting surfaces 7, 8 and 9, the surface 9 causing the air flow to adhere more closely to the upper camber of the surface 7. This lifting reaction is exerted by the moving air even at the time when the airplane itself is relatively stationary with respect to the earth. An additional lifting effect is produced by virtue of the air passing between the airfoils 7 and 8, in accordance with the principle more fully described in my previous patent above referred to; it being understood that in the present case this reaction also takes place while the airplane is stationary or moving at a very slow forward speed. A further lift is produced on the stationary cylinders 11 and 12, and more particularly when the airplane has obtained a forward motion relative to the earth, in accordance with the well known Magnus effect. These cylindrical members 11 and 12 offer an imperforate and preferably smooth surface around which the air may circulate, with the exception of the gap provided by the opening such as 15 which is positioned at a point forward of the line drawn vertically through its center in cross section. It is within the contemplation of the invention that the width of this slot may be increased or decreased to the degree desired.

A part of the air flow caused by the rotation of the rotors 16 and 17 passes through the opening 15 and is sucked inwardly by the oppositely rotating rotors 19 and 20, thereby passing inwardly transversely to the body of the airplane and inwardly and rearwardly through the air ducts communicating with the central air duct or conduit 38. The propeller 37 acts upon the air in the conduit 38 to impel it toward the tail of the airplane through which it is expelled in the following manner. With the conical baffle plate set in its open position as illustrated in Fig. 1 a part of the air passes directly outwardly through the nozzle-like exhaust 39 and thereby produces further reaction to drive the airplane forward with a rocket-like effect. That portion of the air flow which is deflected by the baffle 40 passes outwardly in opposite directions into the auxiliary air ducts or conduits 41 and 42 from which it is passed outwardly against the leading edges of the airfoils 44 and 45 and thereby creating a flow of air acting in the same manner and with the same effect on these airfoils to produce a lifting effect as if the airfoils were in themselves moving forward relative to the earth.

It will therefore be seen that by the present invention a lifting effect is created both with and without a forward movement of the airplane relative to the earth. Furthermore an adjustable degree of control is provided on the tail surfaces, both horizontal and vertical, by adjusting the openings in the conical baffle 40 by means of the adjustable cooperating plate 43; which adjustment may be found useful in maneuvering at the takeoff or landing or in flying at slow speeds, and it furthermore may be found useful in obtaining the proper aerodynamic balance under varying conditions of load.

Having thus described my invention with particularity with reference to its preferred form, it will be obvious to those skilled in the art, after understanding my invention, that various changes and modifications may be made therein without departing from the spirit and scope of my invention, and I aim in the appended claims to cover such changes and modifications as are within the scope of the invention.

What I claim is:

1. In an aircraft the combination of a body provided with air conduit means, transversely extending rotatable means for moving air exteriorly of and into said body, means for impelling air in said conduit means, and lifting and sustaining surfaces carried by said body and acted upon by said moving air.

2. In an aircraft the combination of a body provided with air conduit means, transversely extending rotatable means for moving air thereabout and axially thereof, means for conducting said axially moving air into said conduit means, means for impelling air in said conduit means, and lifting and sustaining surfaces carried by said body and acted upon by said moving air.

3. In an aircraft the combination of a body provided with air conduit means having a rearwardly directed outlet opening, transversely extending rotatable means for moving air into said body, means for impelling air in said conduit means, airfoil means carried by said body and adapted to be acted upon by said air passed through said conduit means, and means in said conduit means for controlling the flow of air acting upon said airfoil means and said outlet opening.

4. In an aircraft the combination of a body provided with air conduit means extending rearwardly of said body and having an outlet for emitting air rearwardly therefrom, transversely extending rotatable means for moving air into said body, and means for exhausting the air from within said rotatable means and for impelling air in said conduit means whereby said transversely extending means and said air impelling means will cause an air discharge for motivating said aircraft.

5. In an aircraft the combination of a plurality of rotors one within the other adapted to create an air flow, each of said rotors having openings in the wall thereof for the passage of air therethrough, airfoil means adjacent to and extending axially of said rotors and within the influence of said air flow, and means cooperating with said rotors for collecting a part of the air passing through the walls of said rotors and for preventing it from passing across the surface of said airfoil means.

6. In an aircraft the combination of a plurality of transversely extending rotors one within the other, each of said rotors having blades extending axially thereof and providing therebetween openings in the wall thereof for the passage of air therethrough, airfoil means adjacent to and extending axially of said rotors, and means cooperating with said rotors for deflecting across said axially extending airfoil means a part of the air influenced by the outer of said rotors and for collecting the air passing through the walls of both of said rotors and preventing it from passing across the surface of said airfoil means.

7. In an aircraft the combination of a plurality of rotors one within the other adapted to create an air flow, each of said rotors having openings in the wall thereof for the passage of air therethrough, airfoil means adjacent to and extending axially of said rotors and within the influence of said air flow, and means cooperating with said rotors for collecting a part of the air moved by said rotors and preventing it from passing across the surface of said airfoil means.

8. In an aircraft the combination of a hollow member of cylindrical form extending transversely to the line of flight, said member having a longitudinally extending forwardly positioned opening and being otherwise substantially imperforate, a first rotatable cylinder surrounding said member and being provided with means for moving air around the surface thereof, a second rotatable cylinder located within and extending axially of said member for drawing air through said slot and into said member, and a body provided with air conduit means in communication with the interior of said member.

9. In an aircraft the combination of a relatively smooth hollow member of cylindrical form extending transversely to the line of flight, said member having a longitudinally extending forwardly positioned opening, a first rotatable cylinder surrounding said member and being provided with means for moving air around the surface thereof, a second rotatable cylinder located within and extending axially of said member for drawing air through said slot and into said member, and a body provided with air conduit means in communication with the interior of said member.

10. In an aircraft the combination of a relatively smooth hollow member of cylindrical form extending transversely to the line of flight, said member having a longitudinally extending forwardly positioned opening, a first rotatable cylinder surrounding said member and being provided with means for moving air around the surface thereof, a second rotatable cylinder located within and extending axially of said member for drawing air through said slot and into said member, a body provided with air conduit means in communication with the interior of said member, means within said conduit for exhausting air from said second rotatable cylinder and for expelling it rearwardly through said body, said conduit having two means of escape for said expelled air, and adjustable means for controlling said means of escape.

In testimony whereof I have signed my name to this specification.

HENRY P. MASSEY.